United States Patent
Tsujimoto et al.

(12) 
(10) Patent No.: US 6,532,852 B1
(45) Date of Patent: *Mar. 18, 2003

(54) BAND SAW BLADE

(75) Inventors: Susumu Tsujimoto, Hyogo (JP); Iwao Kamiyama, Hyogo (JP)

(73) Assignee: Amada Company, Limited, Isehara (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/815,435

(22) Filed: Mar. 11, 1997

(30) Foreign Application Priority Data

Mar. 11, 1996 (JP) .............................. 8-053417

(51) Int. Cl.⁷ .......................... B23D 61/12; B27B 33/06
(52) U.S. Cl. ............................. 83/661; 83/847; 83/848; 83/851
(58) Field of Search .................... 83/835, 846, 847, 83/848, 849, 850, 851, 855, 661, 788

(56) References Cited

U.S. PATENT DOCUMENTS

| | | | | |
|---|---|---|---|---|
| 239,710 A | * | 4/1881 | Boynton | 83/847 |
| 336,739 A | * | 2/1886 | Parker | 83/848 |
| 481,321 A | * | 8/1892 | Wilson | 83/850 X |
| 1,850,478 A | * | 3/1932 | Schaefer | 83/847 |
| 4,195,543 A | | 4/1980 | Tapply et al. | 83/794 |
| 4,557,172 A | | 12/1985 | Yoneda | 83/848 |
| 4,727,788 A | | 3/1988 | Yoshida et al. | 83/848 |
| 4,813,324 A | | 3/1989 | Yoshida et al. | 83/848 |
| 4,967,477 A | * | 11/1990 | Sanford | 83/847 X |
| 5,094,135 A | | 3/1992 | Nakahara et al. | 83/847 |
| 5,410,935 A | * | 5/1995 | Holston et al. | 83/851 |
| 5,425,296 A | * | 6/1995 | Kullmann et al. | 83/847 X |

\* cited by examiner

Primary Examiner—Clark F. Dexter

(57) ABSTRACT

The present invention provides a band saw blade 1 which has less difference in cut areas of workpieces with small diameters and cut areas of workpieces with large diameters, and is capable of weakening the cutting resistance and preventing unintentional bending of a cutting line and noise generation when a workpiece, which cannot easily be cut, is cut. The band saw blade 1 has, on the back surface 5 of a body 3 thereof, a wavy back surface 5 which is changed periodically or irregularly. A plurality of imaginary curves L1,L2 running parallel to the wavy undulation provided for the back surface 5 are formed opposite to the back surface. Moreover, a plurality of saw teeth 2,4,6,8,10 having tooth tips which substantially describe the imaginary curves L1,L2 are formed. Thus, constant areas can be cut by the band saw blade 1 regardless of the diameter of the workpieces required to be cut. Moreover, the cutting resistance can be weakened, and unintentional bending and noise can be prevented.

1 Claim, 13 Drawing Sheets

FIG.4

| | ① STAINLESS STEEL SUS304 (JIS) 100mm. IN DIAMETER | ② STAINLESS STEEL SUS304 (JIS) 400mm. IN DIAMETER | RATIO (②/①)×100 (%) |
|---|---|---|---|
| SAW BLADE A | 51051 | 8796 | 17.2 |
| SAW BLADE B | 52622 | 12566 | 23.9 |
| SAW BLADE C | 51836 | 26389 | 50.9 |
| SAW BLADE D | 48930 | 27646 | 56.5 |
| SAW BLADE E | 54192 | 40212 | 74.2 |

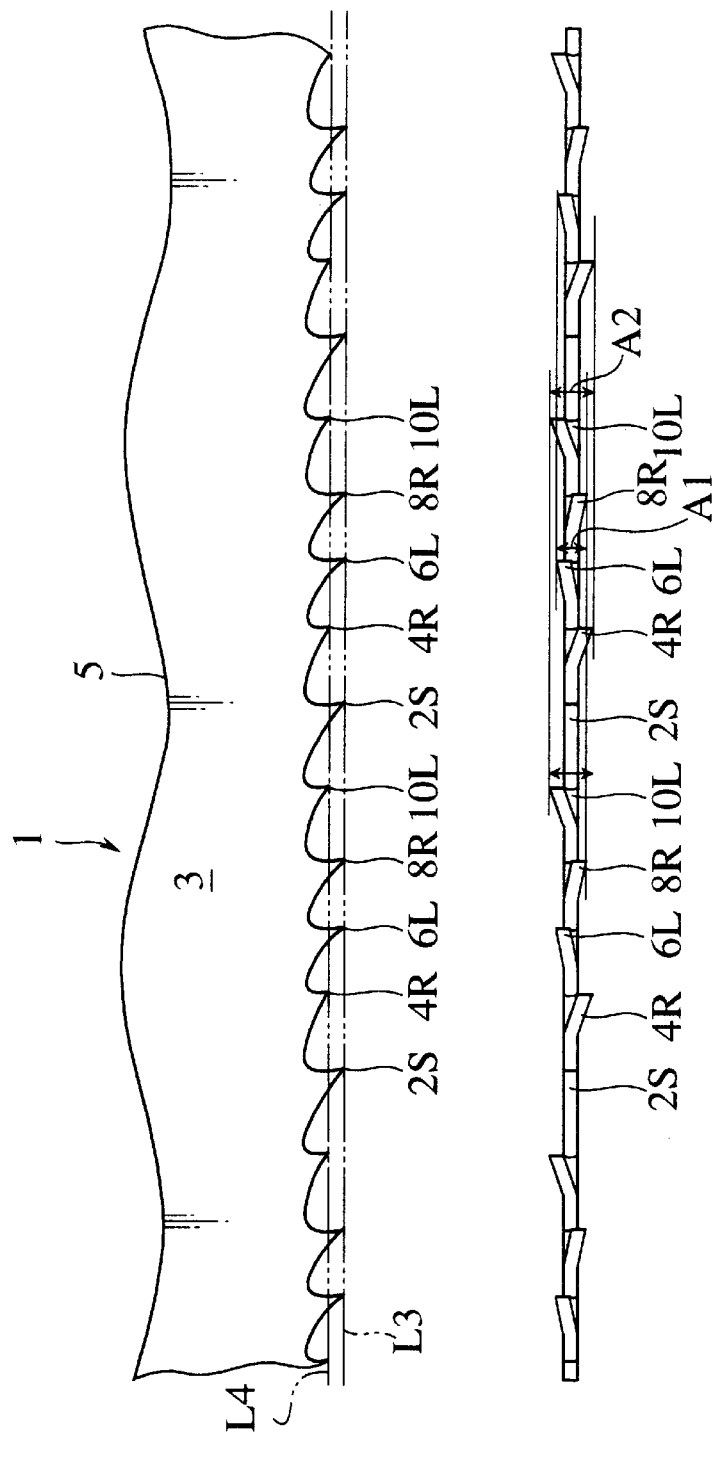

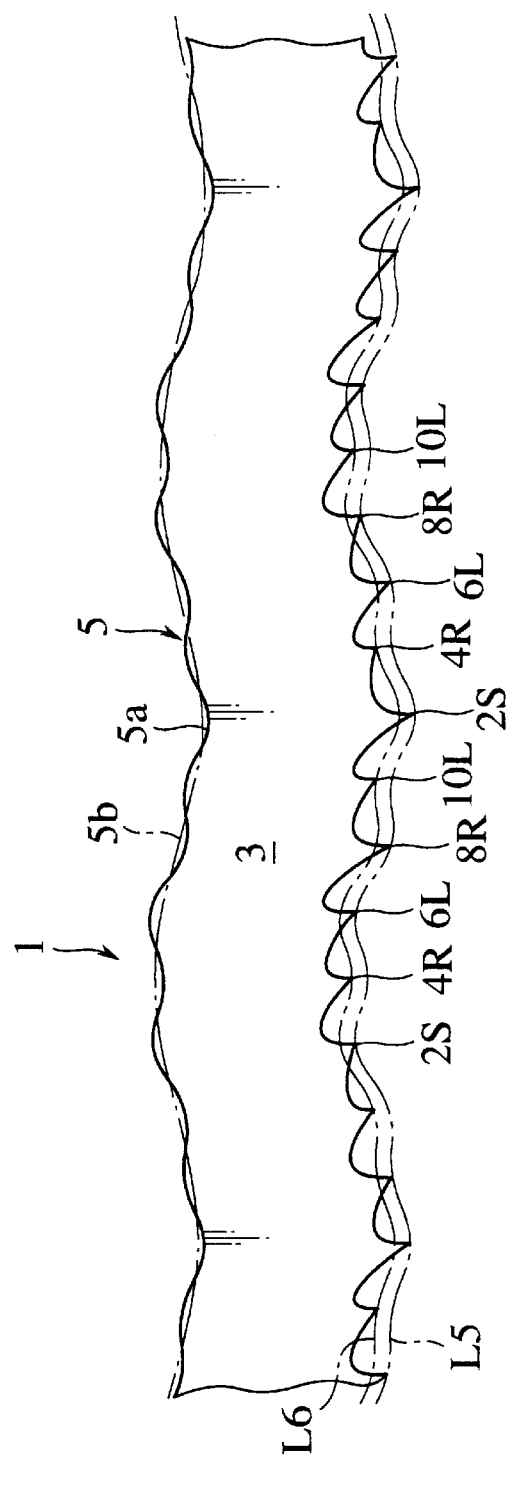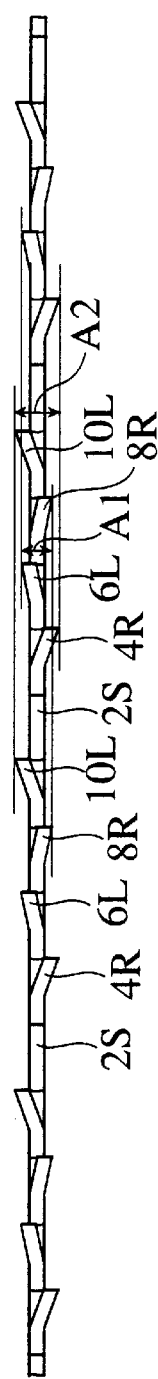
FIG.6A
FIG.6B

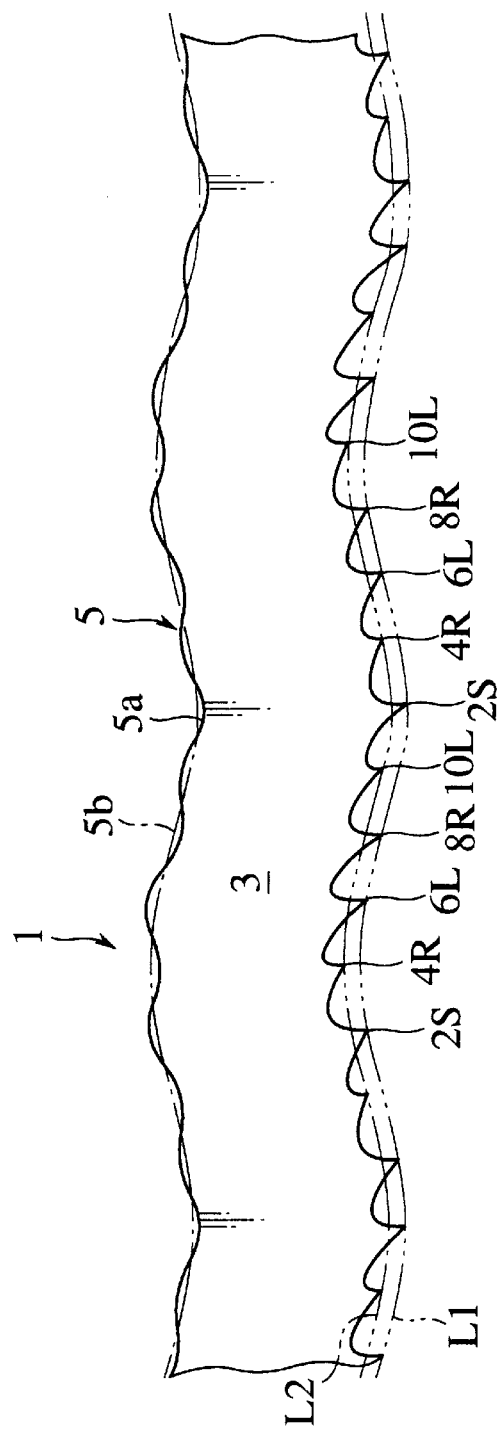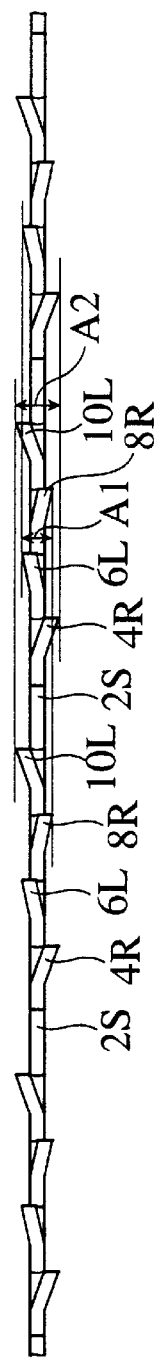
FIG.7A
FIG.7B

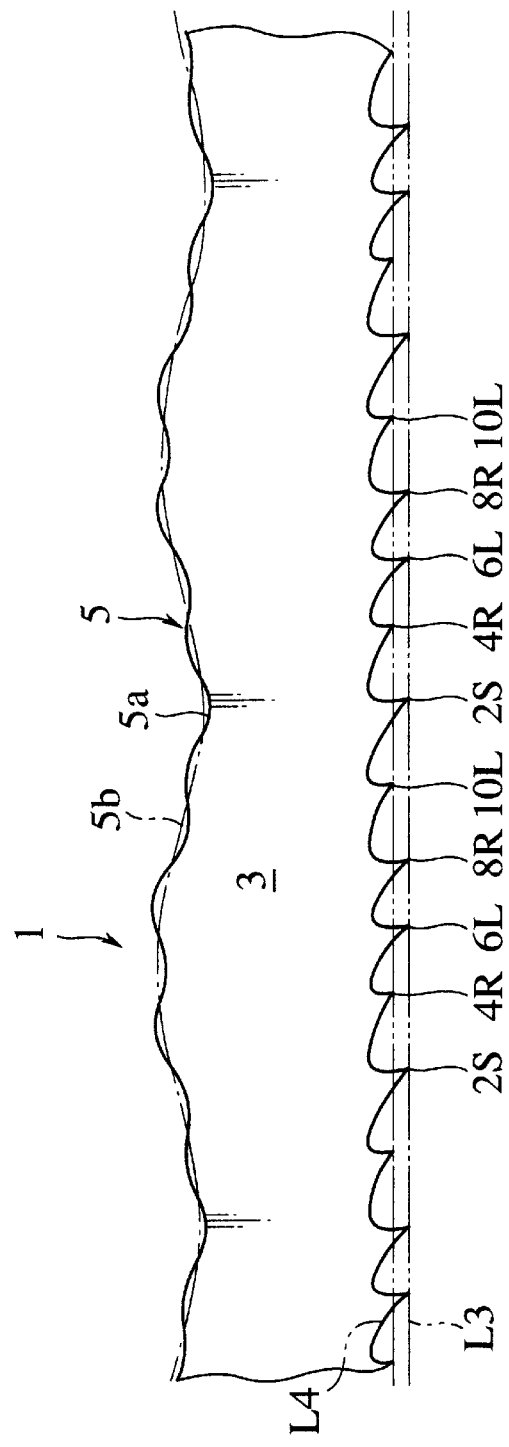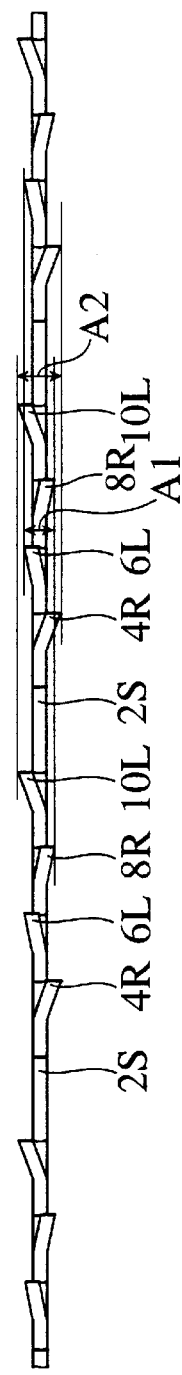
FIG.8A
FIG.8B

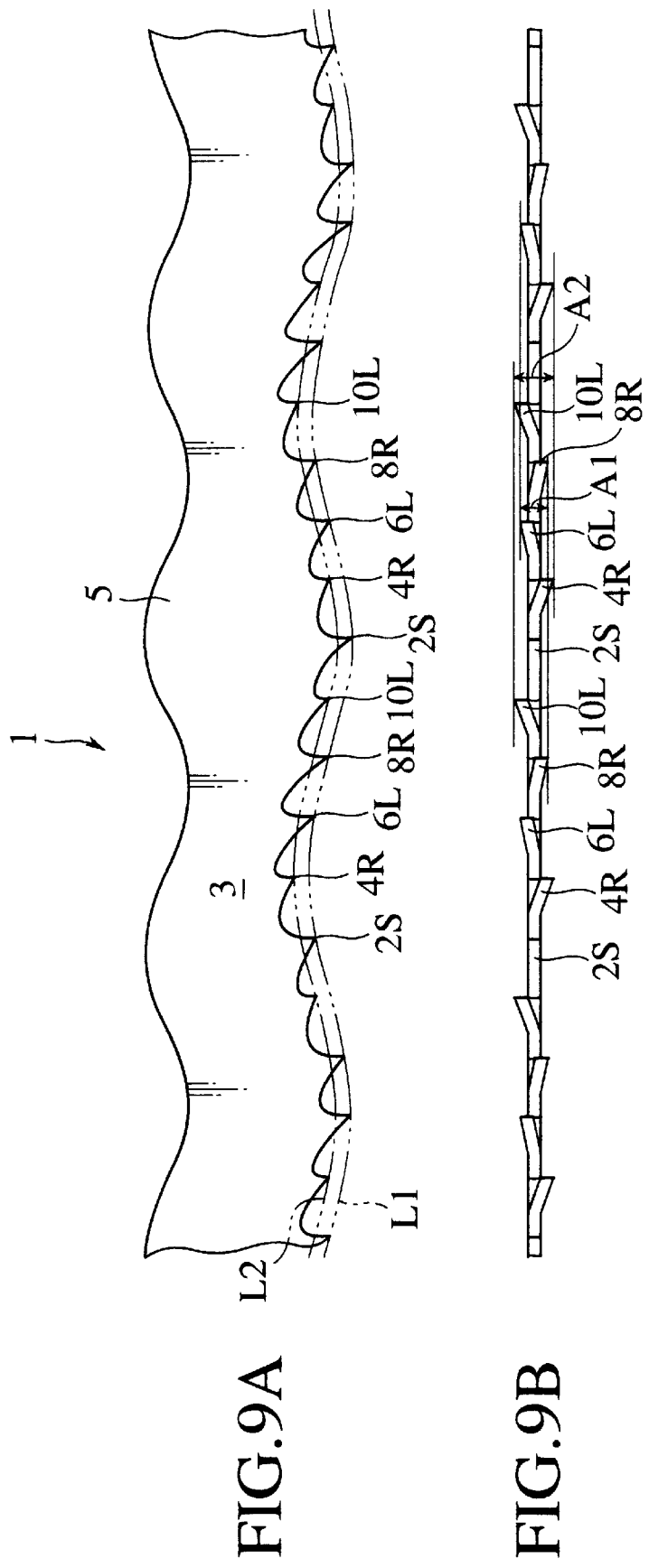

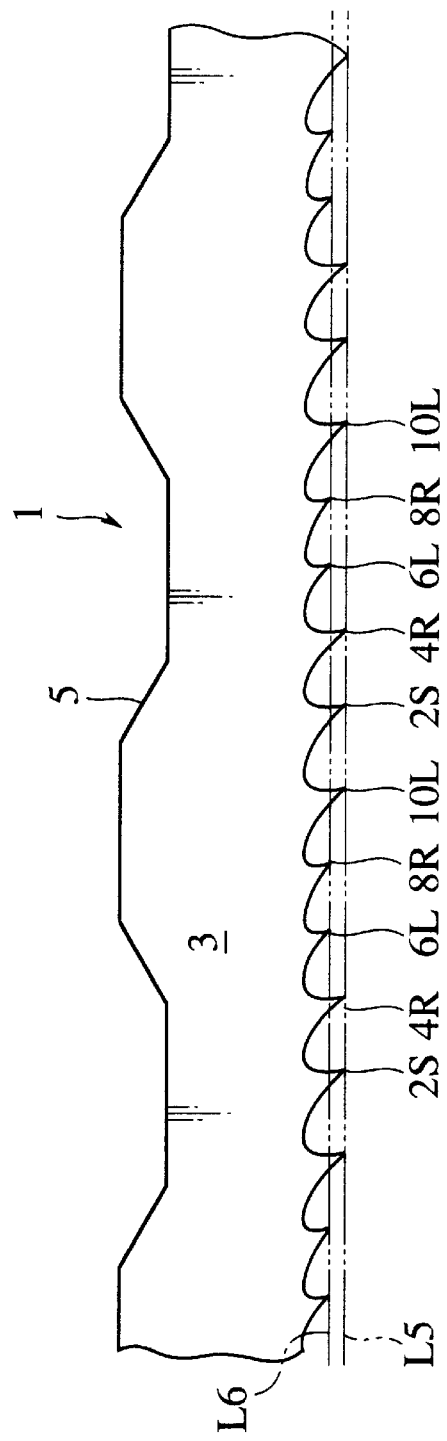
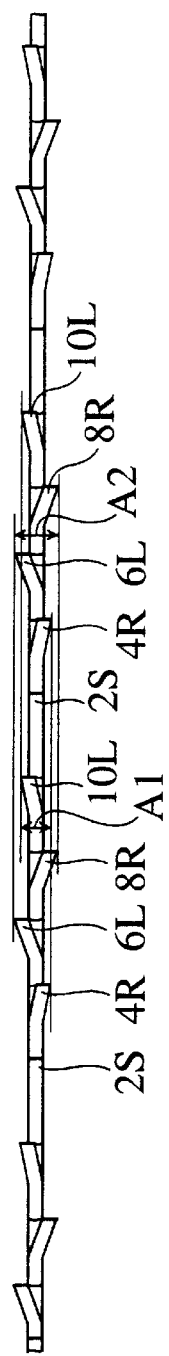
FIG.10A
FIG.10B

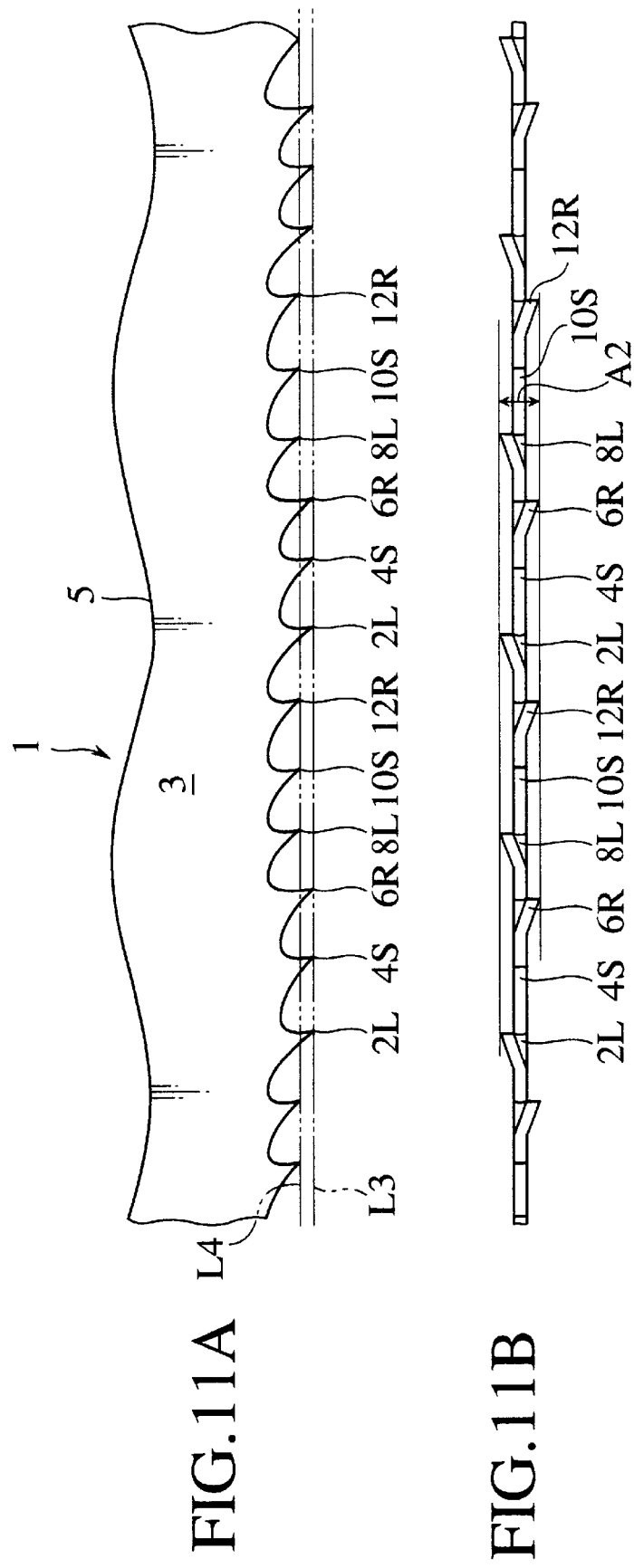

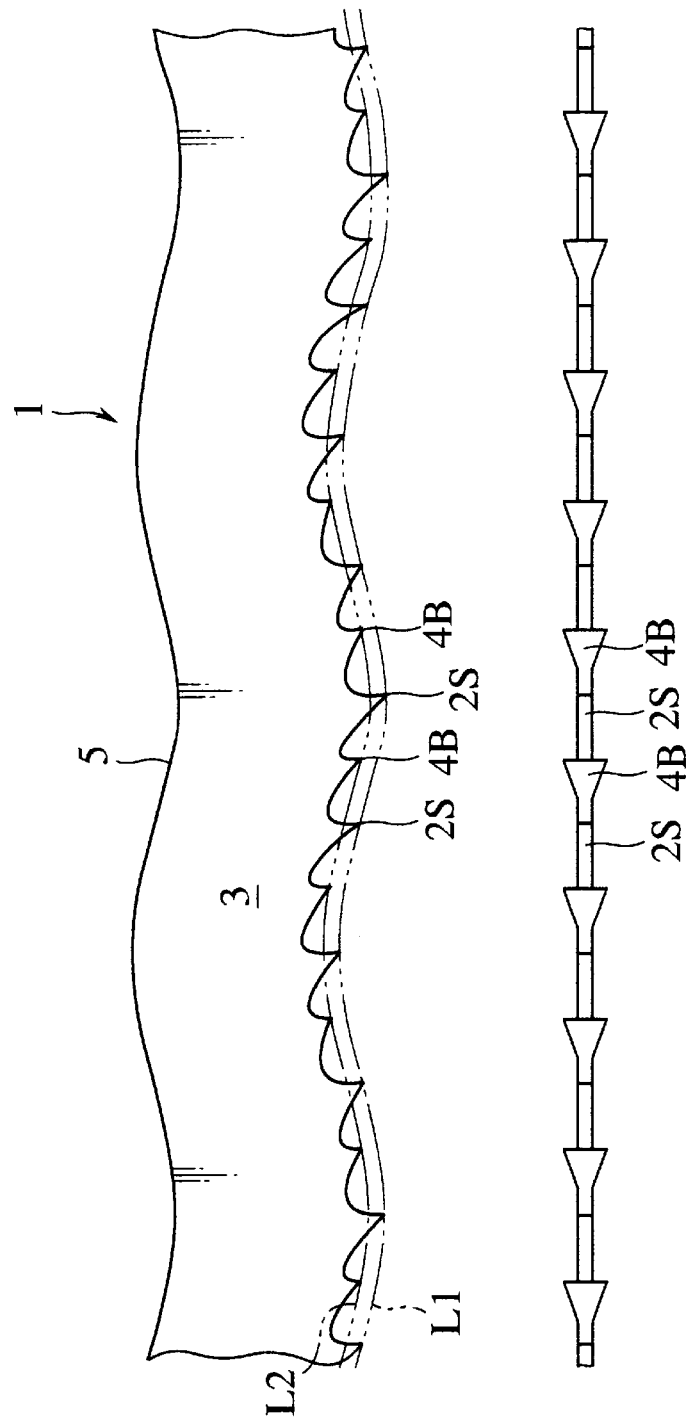

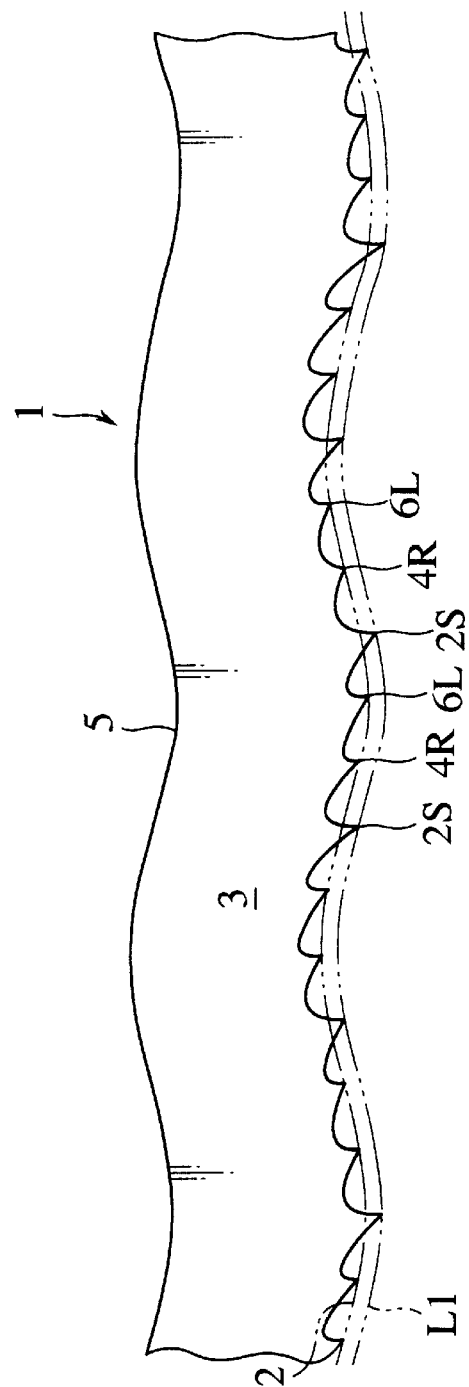
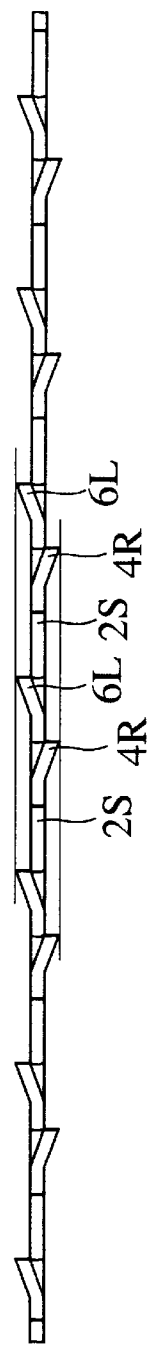
FIG.13A
FIG.13B

BAND SAW BLADE

BACKGROUND OF THE INVENTION

1. Field of the Invention

The present invention relates to a band saw blade, and more particularly to a band saw blade whereby deviation of the cut and noise can be restrained during the cutting of the workpiece.

2. Description of the Related Art

Conventionally, a band saw blade has a left set teeth and right set teeth which are bent to the left and right respectively in the direction of the thickness of the band saw blade (the transverse direction). Hitherto, as one typical example of a band saw blade, there is a band saw blade with a uniform band width and with left set width and right set width which widths are uniform and constant. However, in the conventional band saw blade, cutting resistance increase, so that a deviation of the cut is easily produced. Also, the saw blade will rub against a work-hardening layer formed on the surface of workpiece during the cutting operation, so that noise is produced.

In order to restrain the noise and the deviation during the cutting operation, a variety of band saw blades have been developed which have structures such that the heights, the set width and pitches of the saw teeth are varied.

For example, as disclosed in U.S. Pat. No. 4,195,543, a band saw blade has been disclosed which is formed such that the width of the band portion is constant and a wavy portion is formed in the widthwise direction of the band portion. Another example has been disclosed in U.S. Pat. No. 4,557,172 in which heights of the teeth are made to be different. Other band saw blades have been disclosed in U.S. Pat. No. 4,727,788 and U.S. Pat. No. 4,813,324 in which the heights of the teeth are varied and the set width is enlarged for teeth having low heights. Moreover, a band saw blade has been disclosed in U.S. Pat. No. 5,094,135 in which the back surface is formed into a straight-line shape and a wavy shape is provided such that tooth tips of the saw teeth describe an imaginary curve.

However, when the above-mentioned conventional band saw blades are used to cut workpieces having small diameters which cannot easily be cut, accumulative cut areas are substantially the same even if the band saw blades disclosed in U.S. Pat. No. 4,195,543, U.S. Pat. No. 4,813,324 and U.S. Pat. No. 5,094,135 are used if the material of the tip portion of the teeth of the band saw blade is the same. However, when workpieces having large diameters are cut, the cutting operations using the band saw blades result in remarkable difference.

When the area of workpieces, which have large diameters and which cannot easily be cut, can be cut and the area of workpieces, which have small diameters, can be cut by the band saw blades improved by conventional technology are compared, the areas which can be cut are considerably small in the case where workpieces having large diameters are cut.

Although the back surface and the tooth tip of the band saw blade disclosed in U.S. Pat. No. 4,195,543 are formed into wavy shapes, swarf cannot be fined. Although the band saw blade disclosed in U.S. Pat. No. 4,813,324 is able to fine swarf, the cut length cannot be shortened because the wavy shape is not employed. Although the band saw blade disclosed in U.S. Pat. No. 5,094,135 is able to fine swarf, the structure in which the wavy shape which describes the imaginary curve is formed in only the tooth tip portion attains an unsatisfactory effect to shorten the cut length.

SUMMARY OF THE INVENTION

An object of the present invention is to provide a band saw blade which is capable of realizing similar cut areas regardless of the diameter of the workpieces required to be cut, reducing cutting resistance and restraining deviation of the cut from the cutting line desired and noise generation during the cutting operation.

In order to achieve the foregoing object, according to a first aspect of the invention, there is provided a bad saw blade, comprising: a wavy back surface which is changed periodically or irregularly; and a plurality of tooth groups having tooth tips which substantially describe a plurality of imaginary curves or a plurality of imaginary straight lines running parallel to the back surface.

According to a second aspect of the invention, as it depends from the first aspect, larger set width are provided for tooth groups having tooth tips which substantially describe the imaginary curve or the imaginary straight line near the back surface among the plural tooth groups having the tooth tips which substantially describe the plural imaginary curves or the plural imaginary straight lines far the back surface.

According to a third aspect of the invention, as it depends from the first and the second aspects, tooth groups have tooth tips which substantially describe an imaginary curve or an imaginary straight line farthest from the back surface among the plural tooth groups having the tooth tips which substantially describe the plural imaginary curves or the plural imaginary straight lines running parallel to the back surface are composed of a plurality of straight teeth or a plurality of right and left set teeth or a plurality of straight teeth and a plurality of right and left set teeth, and the tooth groups which substantially describe the other imaginary curves or the imaginary straight lines are composed of a plurality of right and left set teeth.

When a workpiece is cut by the band saw blade according to claims 1 to 3 having the structure such that the back surface which is periodically or irregularly changed is rocked along the backup guide of the band saw blade, the cut length can be shortened even if a workpiece having a large diameter is cut. Since the structure is formed such that the set width is enlarged for the tooth group having the tooth tip which substantially describes the imaginary curve or the imaginary straight line near the back surface, swarf can be fined.

Even if a workpiece having a large diameter is cut, the cut length can be shortened as if a workpiece having a small diameter is cut. Since swarf can be fined, the cutting resistance can be weakened, noise can be prevented, unintentional bending can be prevented during the cutting operation.

According to a forth aspect of the invention, as it depends from the first and the second aspects, tooth groups having tooth tips which substantially describe an imaginary curve or an imaginary straight line farthest from the back surface among the plural tooth groups having the tooth tips which substantially describe the plural imaginary curves or the plural imaginary straight lines running parallel to the back surface are composed of a plurality of straight teeth or a plurality of dovetail set teeth or a plurality of straight teeth and a plurality of dovetail set teeth, and the tooth groups which substantially describe the other imaginary curves or the imaginary straight lines are composed of a plurality of dovetail set teeth.

Since the band saw blade according to the forth aspect of the present invention has the structure such that the right and left set teeth employed in the structure according to the third aspect are changed to dovetail set teeth, basic effects can be obtained similarly to the foregoing structure. However, employment of the dovetail set teeth attains another effect in that the ghost pattern in the cut surface can be reduced significantly and therefore the shape of the cut surface can be improved.

In the construction according to the aspects described above, when a workpiece is cut by the band saw blade, the wavy back surface which is periodically or irregularly changed is rocked along the backup guide. Therefore, the cut length can be shortened even if a workpiece having a large diameter is cut. Since the structure is formed such that the set width of the tooth group is enlarged which has the tooth tip which substantially describes the imaginary curve or the imaginary straight line near the back surface, the swarf can be fined.

The structure in which both of the back surface and the saw tooth portion are formed into the wavy shapes is considered to attain an oscillation-cutting effect when a workpiece is cut. As a result of the synergistic effect of the three elements, a further satisfactory effect can be obtained.

Even if a workpiece having a large diameter, which is a workpiece which cannot easily be cut, is cut, the cut length can be shortened as if a workpiece having a small diameter is cut. Thus, the swarf can be fined and, therefore, the cutting resistance can be weakened, noise can be eliminated and unintentional bending can be prevented when the workpiece is cut. That is, the life-time of the band saw blade can be realized regardless of the diameter of the workpiece. As a result, the life-time of the band saw blade can easily be estimated in accordance with the cut area. Thus, the cutting management can easily be performed and the cutting plan can easily be executed as compared with the conventional band saw blade. When a workpiece having a large diameter is cut, a further improved cost-cutting effect can be obtained because the life-time of the band saw blade according to the present invention is significantly enlarged as compared with the conventional band saw blade.

The structure in which the right and left set teeth are formed into the dovetail set teeth attains an effect in that the ghost pattern of the cut surface can significantly be reduced and thus the cut surface has an excellent shape.

According to a fifth aspect of the invention, there is provided a band saw blade, comprising: a back surface having a shape formed by overlapping a plurality of waves which are changed periodically or irregularly; and a plurality of tooth groups having tooth tips which substantially describe a plurality of imaginary curves or a plurality of imaginary straight lines running parallel to the back surface.

According to a sixth aspect of the invention, as it depends from the fifth aspect, larger set width are provided for tooth groups having tooth tips which substantially describe the imaginary curve or the imaginary straight line near the back surface among the plural tooth groups having the tooth tips which substantially describe the plural imaginary curves or the plural imaginary straight lines far the back surface.

According to a seventh aspect of the invention, as it depends from the fifth and the sixth aspects, tooth groups having tooth tips which substantially describe an imaginary curve or an imaginary straight line farthest from the back surface among the plural tooth groups having the tooth tips which substantially describe the plural imaginary curves or the plural imaginary straight lines running parallel to the back surface are composed of a plurality of straight teeth or a plurality of right and left set teeth or a plurality of straight teeth and a plurality of right and left set teeth, and the tooth groups which substantially describe the other imaginary curves or the imaginary straight lines are composed of a plurality of right and left set teeth.

When the band saw blade according to the fifth aspect to the seventh aspect is used to cut a workpiece, the back surface having a shape formed by overlapping a plurality of waves, which are changed periodically or irregularly, are rocked along the backup guide of the band saw blade. Therefore, the cut length can be shortened even if a workpiece having a large diameter is cut. Since the structure is formed such that the set width is enlarged for the tooth group having the tooth tip which substantially describes the imaginary curve or the imaginary straight line near the back surface, swarf can be fined.

That is, the cut length can be shortened even if a workpiece having a large diameter is cut as if a workpiece having a small diameter is cut. Since the swarf can be fined, the cutting resistance can be weakened, noise can be prevented and unintentional bending can be prevented during the cutting operation.

According to a eighth aspect of the invention, as it depends from the fifth and the sixth aspects, tooth groups having tooth tips which substantially describe an imaginary curve or an imaginary straight line farthest from the back surface among the plural tooth groups having the tooth tips which substantially describe the plural imaginary curves or the plural imaginary straight lines running parallel to the back surface are composed of a plurality of straight teeth or a plurality of dovetail set teeth or a plurality of straight teeth and a plurality of dovetail set teeth, and the tooth groups which substantially describe the other imaginary curves or the imaginary straight lines are composed of a plurality of dovetail set teeth.

Since the band saw blade according to the eighth aspect of the present invention has the structure such that the right and left set teeth employed in the structure according to claim 7 are changed to the dovetail set teeth, a similar effect to that obtainable from the foregoing structure can be obtained. Since the dovetail set teeth are employed, the ghost pattern in the cut surface can significantly be reduced and an effect can be obtained in that the shape of the cut surface can be improved.

In the construction according to the fifth aspect to the eighth aspect, when the band saw blade is used to cut a workpiece, the back surface having a shape formed by overlapping a plurality of waves which are periodically or irregularly changed is rocked along the backup guide. Therefore, the cut length can be shortened even if a workpiece having a large diameter is cut. Since the structure is formed such that the set width is enlarged for the tooth group having the tooth tip which substantially describes the imaginary curve or imaginary straight line near the back surface, the swarf can be fined.

That is, the cut length can be shortened even if a workpiece having a large diameter which is a workpiece which cannot easily be cut is cut as if a workpiece having a small diameter is cut. Thus, the cutting resistance can be weakened. Since the back surface has the shape formed by overlapping a plurality of waves, enlargement of noise generated due to resonance of the band saw blade can effectively be prevented. Moreover, bending can be prevented when a workpiece is cut.

That is, similar life-time of the band saw blade can be realized regardless of the diameter of the workpiece required to be cut, the estimation of the life-time of the band saw blade can easily be performed in accordance with the cut area. Thus, management of the cutting operation and the cutting plan can easily be performed as compared with the conventional band saw blade. When a workpiece having a large diameter is cut, the cost can further significantly be reduced as compared with the conventional structure because the life-time of the band saw blade according to the present invention is significantly longer than that of the conventional band saw blade.

According to a ninth aspect of the invention, there is provided a band saw blade, comprising: a wavy back surface which is changed periodically or irregularly; and a plurality of tooth groups having tooth tips which substantially describe a plurality of imaginary curves formed opposite to the back surface to run parallel to one another without correlation or synchronism with the back surface.

According to a tenth aspect of the invention, as it depends from the ninth aspect, larger set width are provided for tooth groups having tooth tips which substantially describe the imaginary curve near the back surface among the plural tooth groups having the tooth tips which substantially describe the plural imaginary curves running parallel to the back surface and formed opposite to the back surface.

According to a eleventh aspect of the invention, as it depends from the ninth aspect and the tenth aspect, a tooth group having the tooth tips which substantially describes an imaginary curve farthest from the back surface among the plural tooth groups having the tooth tips which substantially describe the plural imaginary curves formed opposite to the back surface and running parallel to the back surface are composed of a plurality of straight teeth or a plurality of right and left set teeth or a plurality of straight teeth and a plurality of right and left set teeth, and tooth groups having the tooth tips which substantially describe other imaginary curves are composed of a plurality of right and left set teeth.

According to a twelfth aspect of the invention, as it depends from the ninth aspect and the tenth aspect, a tooth group having the tooth tips which substantially describes an imaginary curve farthest from the back surface among the plural tooth groups having the tooth tips which substantially describe the plural imaginary curves formed opposite to the back surface and running parallel to the back surface are composed of a plurality of straight teeth or a plurality of dovetail set teeth or a plurality of straight teeth and a plurality of dovetail set teeth, and tooth groups having the tooth tips which substantially describe other imaginary curves are composed of a plurality of dovetail set teeth.

In the construction according to the ninth aspect to the twelfth aspect, the wavy back surface which is changed periodically or irregularly is provided and a plurality of tooth groups having the tooth tips which substantially describe a plurality of imaginary curves formed opposite to the back surface to run parallel to one another without correlation or synchronism with the back surface are formed. Therefore, the synchronism between the wave of the back surface and the wave of the tooth tip portion is lost. Therefore, noise generated due to resonance of the band saw blade can be restrained further effectively. Moreover, deviation of the cut which is unintentional bending of the cutting line can also be restrained.

That is, similar life-time of the band saw blade can be realized regardless of the diameter of the workpiece required to be cut. Therefore, management of the cutting operation and the cutting plan can easily be performed as compared with the conventional band saw blade. When a workpiece having a large diameter is cut, the cost can further significantly be reduced as compared with the conventional structure because the life-time of the band saw blade according to the present invention is significantly longer than that of the conventional band saw blade.

BRIEF DESCRIPTION OF THE DRAWINGS

FIGS. 1A and 1B show a band saw blade which is an essential portion of the present invention, in which FIG. 1A is a front view, and FIG. 1B is a bottom view.

FIG. 4 is a table showing ratio of the cut cross sectional areas when workpieces each having a small diameter and workpieces each having a large diameter are cut by using various band saw blades.

FIGS. 5A and 5B show a band saw blade according to a second embodiment of the present invention, in which FIG. 5A is a front view and FIG. 5B is a bottom view.

FIGS. 6A and 6B show a band saw blade according to a third embodiment of the present invention, in which FIG. 6A is a front view and FIG. 6B is a bottom view.

FIGS. 7A and 7B show a band saw blade according to a fourth embodiment of the present invention, in which FIG. 7A is a front view and FIG. 7B is a bottom view.

FIGS. 8A and 8B show a band saw blade according to a fifth embodiment of the present invention, in which FIG. 8A is a front view and FIG. 8B is a bottom view.

FIGS. 9A and 9B show a band saw blade according to a sixth embodiment of the present invention, in which FIG. 9A is a front view and FIG. 9B is a bottom view.

FIGS. 10A and 10B show a band saw blade according to a seventh embodiment of the present invention, in which FIG. 10A is a front view and FIG. 10B is a bottom view.

FIGS. 11A and 11B show a band saw blade according to an eighth embodiment of the present invention, in which FIG. 11A is a front view and FIG. 11B is a bottom view.

FIGS. 12A and 12B show a band saw blade according to a ninth embodiment of the present invention, in which FIG. 12A is a front view and FIG. 12B is a bottom view.

FIGS. 13A and 13B show a band saw blade according to a tenth embodiment of the present invention, in which FIG. 13A is a front view and FIG. 13B is a bottom view.

DESCRIPTION OF THE PREFERRED EMBODIMENTS

An embodiment of the present invention will now be described with reference to the drawings.

Figure 1:
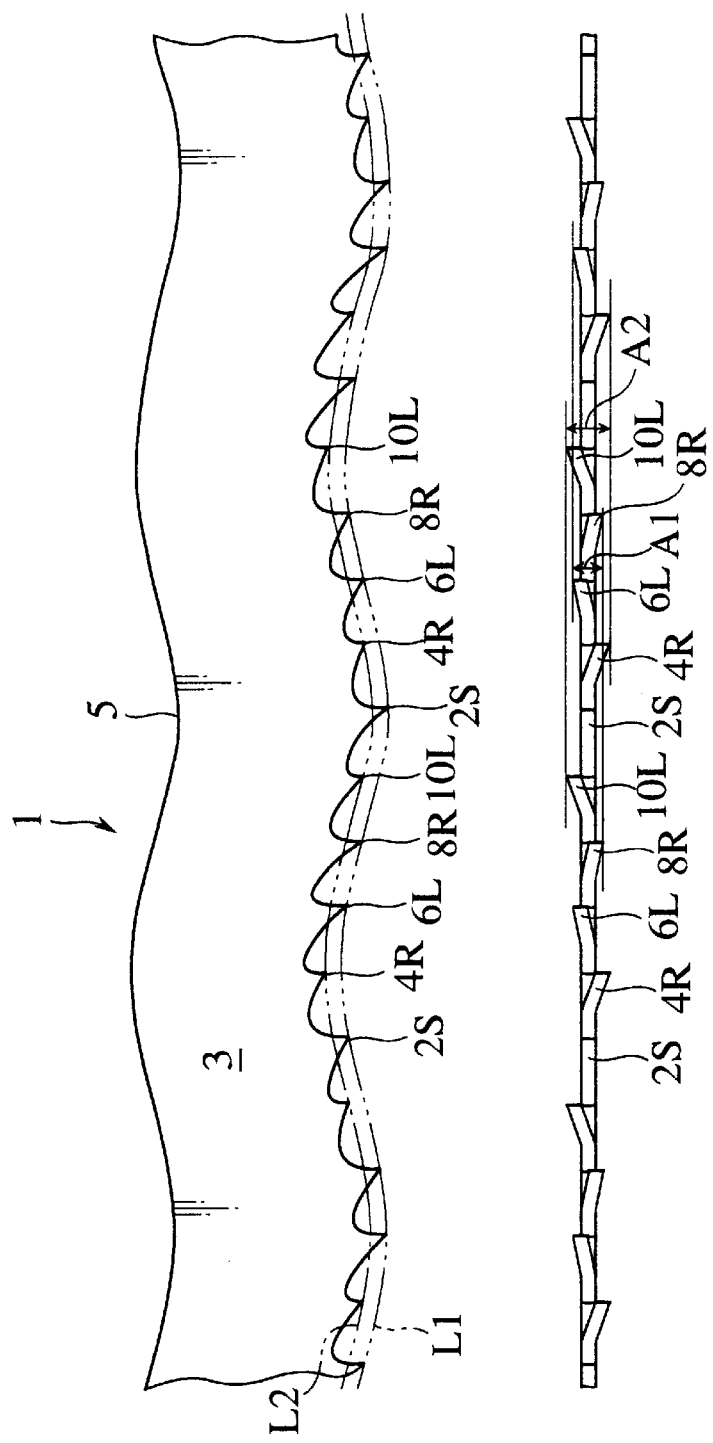

Referring to FIGS. 1A and 1B, FIGS. 1A and 1B show a first embodiment of the present invention. A band saw blade 1 has a multiplicity of saw teeth formed opposite to a back surface 5 of a body 3 of the band saw blade 1. Specifically, the band saw blade 1 has a wavy back surface 5 which is changed periodically or irregularly. Moreover, the band saw blade 1 has a plurality of saw tooth groups 2S, 6L and 8R each having a tooth tip which substantially describes first imaginary curve L1 running parallel to the wavy undulation formed on the back surface 5. In addition, the band saw blade 1 has a group consisting of saw teeth 4R and 10L each having a tooth tip which substantially describes second imaginary curve L2 running parallel to the first imaginary curve L1.

That is, when the tooth tips of the saw teeth 2S, 6L and 8R are connected by a smooth curve, the first imaginary curve L1 running parallel to the wavy back surface 5 can be obtained at the position opposite to the back surface 5. When the tooth tips of the saw teeth 4R and 10L are connected by a smooth curve, the second imaginary curve L2 running parallel to the first imaginary curve L1 can be obtained.

Since the first imaginary curve L1 is formed at an outer position and the second imaginary curve L2 is formed more inwards adjacent to the back surface 5, the group of the plural saw teeth 2S, 6L and 8R each having the tooth tip which describes the first imaginary curve L1 is a group of high saw teeth. The group of the plural saw teeth 4R and 10L each having the tooth tip which describes the second imaginary curve L2 is a group of low saw teeth.

Although imaginary curves L1 and L2 are employed, three imaginary curves are employed if saw teeth each having an intermediate height (not shown) are provided. That is, when a plurality of groups respectively having different heights are formed, the number of the imaginary curves corresponds to the number of groups respectively having individual heights.

In the band saw blade 1, the saw tooth 2S is a straight tooth or unset tooth having no set width. The saw teeth 4R and 8R are right-hand set teeth, while the saw teeth 6L and 10L are left-hand set teeth. As can be understood from FIGS. 1A and 1B, the right and left set width A2 of the right and left set teeth 4R and 10L each having the tooth tip which describes the second imaginary curve L2 is made to be larger than the right and left set width A1 of the right and left set teeth 8R and 6L each having the tooth tip which describes the first imaginary curve L1.

That is, the group of the plurality saw teeth having different heights is structured such that the set width A2 of the group of low saw teeth is made to be larger than the set width A1 of the group of the high saw teeth. Namely, the tooth group having the tooth tip which describes the second imaginary curve L2 near the back surface 5 is given a larger set width than the tooth group having the tip describing the first imaginary curve L1 or other imaginary curves for the back surface 5.

Specifically, it is preferable that the wave of the back surface 5 or the amplitude of the plural imaginary curves L1 and L2 be 0.1 mm to 3.0 mm and the distance between the first imaginary curve L1 and the second imaginary curve L2 be 0.05 mm or longer. Although no regular relationship is provided among the imaginary curves L1 and L2 and the plurality of the tooth groups shown in FIGS. 1A and 1B, a regular relationship may be provided such that, for example, the straight teeth 2S describes the tip end of the imaginary curve. Although the right and left set teeth are made to be the set teeth 4R, 6L, 8R and 10L, dovetail teeth may be employed in place of the right and left set teeth.

When a workpiece having a large diameter is cut by the band saw blade 1 having the above-mentioned structure, the wavy back surface 5, which is periodically or irregularly changed, is rocked along the backup guide of the band saw blade 1. Therefore, the cut length can be shortened even if a workpiece having a large diameter is cut. Since the structure is formed such that the set width A2 is made to be more larger for the group of the teeth 4R and 10L each having the tooth tip which substantially describes the second imaginary curve L2 near the back surface 5, swarf can be fined.

That is, even a workpiece having a large-diameter, which cannot be cut easily, can be cut with a short cut length as if a workpiece having a small diameter is cut. Since the swarf can be fined, the resistance during cutting can be weakened and noise can be eliminated. Moreover, unintentional bending in cutting can be prevented.

An example of experiments performed by using the band saw blade 1 to cut workpieces will now be described.

Figure 2:
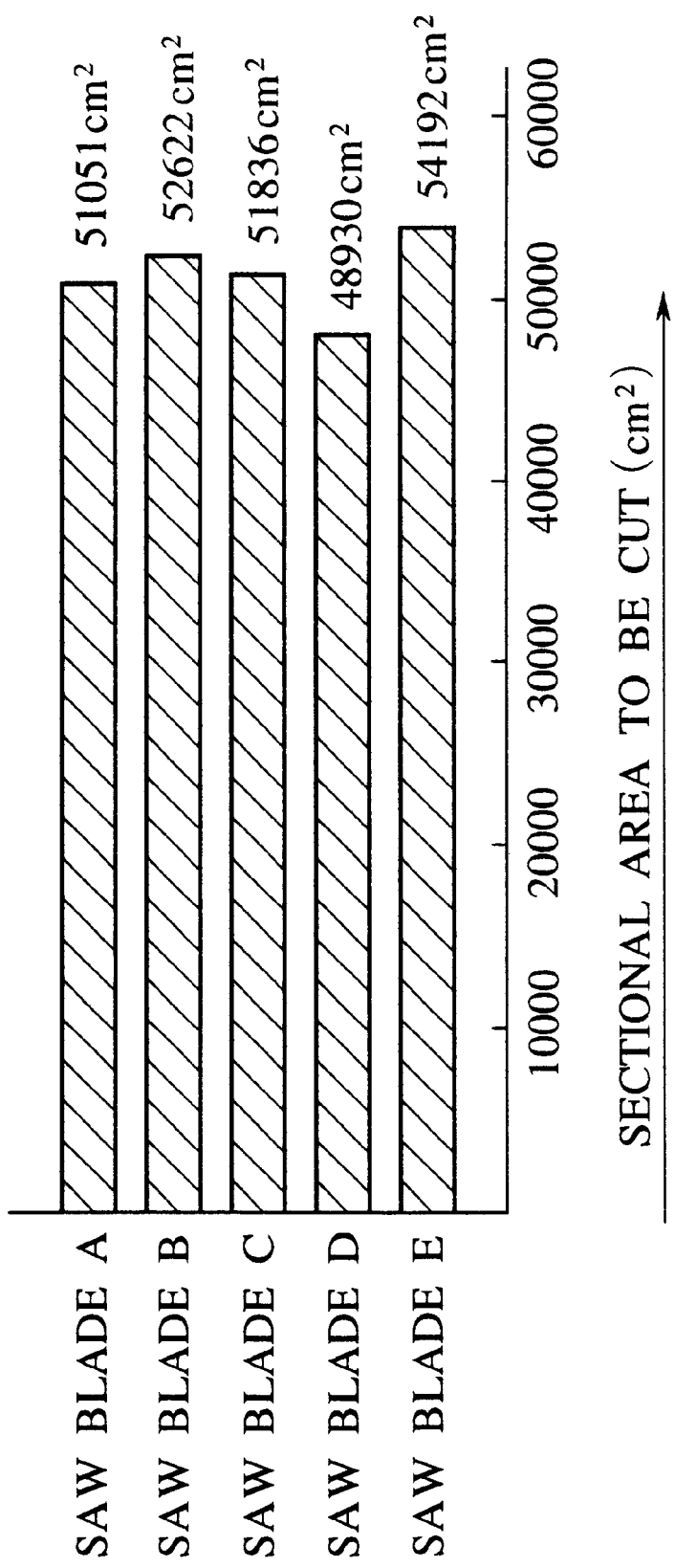
FIG. 2 is a bar graph showing results of an experiment such that the cross sectional areas of cut portions of workpieces each having a small diameter by using various band saw blades are illustrated.

Referring to FIG. 2, solid workpieces each made of stainless steel SUS304 (Japanese Industrial Standards) which was a material which could not easily be cut and having 100 mm. in diameter was cut in the experiment. Note that the following band saw blades were used in the experiment: band saw blade A is a conventional and usual band saw blade structured such that the band width is constant, no wavy shape is formed, the tooth tips of the saw teeth have no vertical difference and the lateral set width is constant. Band saw blade B has a structure similar to that disclosed in U.S. Pat. No. 4,195,543, Band saw blade C has a structure similar to that disclosed in U.S. Pat. No. 4,813,324. Band saw blade D has a structure similar to that disclosed in U.S. Pat. No. 5,094,135 and Band saw blade E has a structure similar to that according to the present invention and shown in FIGS. 1A and 1B. In the experiment, the experimental conditions, including the band saw frame, the material of the saw teeth, the hardness of the material of the saw teeth, the cutting speed, the cutting ratio and the cutting oil, are made to be uniform as much as possible.

As can be understood from FIG. 2, any remarkable difference was not confirmed as indicated by a bar graph which indicates the cross sectional areas of the workpieces respectively cut by the foregoing band saw blades A, B, C, D and E. The reason for this can be considered that the characteristic of the band saw blades B, C, D and E arranged to weaken the cutting resistance could not be exhibited to cut the workpiece having a relatively small diameter of 100 mm and relatively weak cutting resistance.

Figure 3:
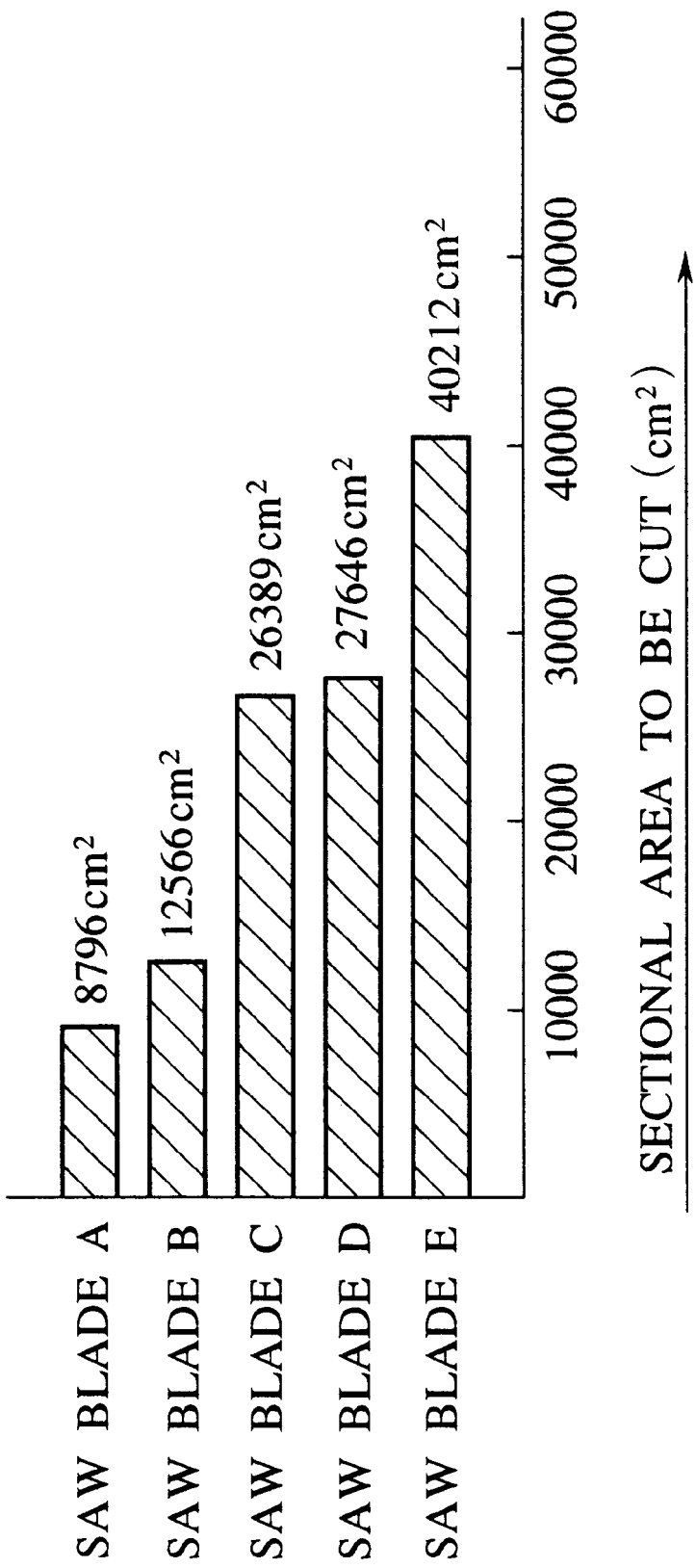
FIG. 3 is a bar graph showing results of an experiment such that the cross sectional areas of cut portions of workpieces each having a large diameter by using various band saw blades are illustrated.

As shown in FIG. 3, an experiment was performed such that solid workpieces each made of stainless steel SUS304 (Japanese Industrial Standards) and 400 mm. in diameter was a material which could not easily be cut were cut. The band saw blades, experiment environment and experiment conditions are the same as those for the experiment shown in FIG. 2. Results are as shown in FIG. 3 such that the cross sectional areas of the workpieces cut by the band saw blades A, B, C, D and E are indicated by a bar graph. As can be understood from FIG. 3, considerably remarkable difference can be confirmed among the band saw blades A, B, C, D and E. In particular, the band saw blade E according to the present invention resulted excellent results four or more times the result of the conventional band saw blade A. A result superior to expectations was obtained.

FIG. 4 is a table showing the results shown in FIGS. 2 and 3 in the form of a list such that the ratios of cross sectional areas of workpieces having the relatively large diameter of 400 mm and workpieces having the relatively small diameter of 100 mm and cut by the band saw blades A, B, C, D and E are shown.

As can be understood from FIG. 4, the band saw blade E according to the present invention reached 74.2% of the cross sectional area of the workpiece having the small diameter. The foregoing results are significantly improved as compared with a result of 17.2% of the conventional band saw blade A. Moreover, a significant improvement was obtained as compared with a result of 56.5% which was the second result obtained by the band saw blade D.

Since the structure of the band saw blade E is formed such that the back surface 5 is formed into a wavy undulation, the band saw blade 1 is rocked by a degree determined by the relationship between the right and left saw blade guide width and the wavy undulation on the back surface when the back surface 5 is guided by the backup guide of the right and left saw blade guide of the saw blade frame during the operation of cutting the workpiece. Therefore, even if a workpiece having a large diameter is cut, an effect can be obtained in that the cut length can be shortened. Also the wavy undulation is provided for the saw teeth, an effect of cutting with vibrations is considered to be obtained when the workpiece is cut. Since the set width of a low saw teeth is enlarged, swarf can be fined and therefore the load generating for each saw tooth can be reduced. As a result of the synergistic effect of the above-mentioned effects, a workpiece having a large diameter can be cut satisfactorily. Thus, cutting deeper than the processed hard layer can be performed without rubbing the processed hard layer.

That is, the synergistic effect of the wavy undulation on each of the back surface 5 and the saw teeth of the band saw blade 1 and enlargement of the set width of low saw teeth enables the foregoing satisfactory cutting operation to be performed. Thus, a significant effect can be obtained.

In order to effectively rock the band saw blade 1 by forming wavy undulation on the back surface 5 of the band saw blade 1, it is preferable that a relationship of W=np/2 (n is a positive odd number) be held assuming that the distance between backup guides of the right and left saw teeth guides is W and the period of the wavy undulation on the back surface 5 is P.

Referring to FIGS. 5A and 5B, a second embodiment of the present invention will now be described.

A band saw blade 1 has a multiplicity of saw teeth formed opposite to a back surface 5 of a body 3 of the band saw blade 1. Specifically, the band saw blade 1 has a wavy back surface 5 which is changed periodically or irregularly. Moreover, the band saw blade 1 has a group consisting of a plurality of saw teeth 2S, 6L and 8R each having a tooth tip which substantially describes first imaginary straight line L3 running parallel to the wavy undulation formed on the back surface 5. In addition, the band saw blade 1 has a group consisting of saw teeth 4R and 10L each having a tooth tip which substantially describes second imaginary straight line L4 running parallel to the first imaginary straight line L3. That is, when the tooth tips of the saw teeth 2S, 6L and 8R are connected by a straight line, the first imaginary straight line L3 can be obtained. When the tooth tips of the saw teeth 4R and 10L by a straight line, the second imaginary straight line L4 running parallel to the first imaginary straight line L3 can be obtained.

Since the first imaginary straight line L3 is formed at an outer position and the second imaginary straight line L4 is formed more inwards, the group of the plural saw teeth 2S, 6L and 8R each having the tooth tip which describes the first imaginary straight line L3 is a group of high saw teeth. The group of the plural saw teeth 4R and 10L each having the tooth tip which describes the second imaginary straight line L4 is a group of low saw teeth. Although the imaginary straight line L3 and L4 are provided in this embodiment, three imaginary straight lines are employed if saw teeth each having an intermediate height are provided. That is, when a plurality of groups respectively having different heights are formed, the number of the imaginary straight lines corresponds to the number of groups respectively having individual heights.

In the band saw blade 1, the saw tooth 2S is a straight tooth having no set width. The saw teeth 4R and 8R are right-hand set teeth, while the saw teeth 6L and 10L are left-hand set teeth. As can be understood from FIGS. 5A and 5B, the right and left set width A2 of the right and left set teeth 4R and 10L each having the tooth tip which describes the second imaginary straight line L4 is made to be lager than the right and left set width A1 of the right and left set teeth 8R and 6L each having the tooth tip which describes the first imaginary straight line L3.

That is, the group of the plurality saw teeth having different heights is structured such that the set width A2 of the group of low saw teeth is made to be larger than the set width A1 of the group of the high saw teeth. That is, the tooth group having the tooth tip which more describes the second imaginary straight line L4 near the back surface 5 is given a larger set width. Specifically, it is preferable that the amplitude of the waves of the back surface 5 be 0.1 mm to 3.0 mm and the distance between the first imaginary straight line L3 and the second imaginary straight line L4 be 0.05 mm or longer.

Although the right and left set teeth are made to be the set teeth 4R, 6L, 8R and 10L, dovetail teeth may be employed in place of the right and left set teeth.

When a workpiece having a large diameter is cut by the band saw blade 1 having the above-mentioned structure, the wavy back surface 5, which is periodically or irregularly changed, is rocked along the backup guide of the band saw blade 1 similarly to the first embodiment. Therefore, the cut length can be shortened even if a workpiece having a large diameter is cut. Since the structure is formed such that the set width A2 is made to be more larger for the group of the teeth 4R and 10L each having the tooth tip which substantially describes the second imaginary straight line L4 near the back surface 5, swarf can be fined.

That is, even a workpiece having a large diameter, which cannot be cut easily, can be cut with a short cut length as if a workpiece having a small diameter is cut. Since the swarf can be fined, the resistance during cutting can be weakened and noise can be eliminated. Moreover, unintentional bending in cutting can be prevented.

Referring to FIGS. 6A and 6B, a third embodiment will now be described. A band saw blade 1 has a multiplicity of saw teeth formed opposite to a back surface 5 of a body 3 of the band saw blade 1. Specifically, the band saw blade 1 has a back surface 5 having a shape formed by overlapping a plurality of waves 5a and 5b which are changed periodically or irregularly. The waves 5a are in the form of small waves, while the waves 5b are in the form of large waves, the waves 5a being formed along the undulation of the waves 5b. The band saw blade 1 has a group consisting of a plurality of saw teeth 2S, 6L and 8R each having a tooth tip which substantially describes first imaginary curve L5 running parallel to the waves 5a. In addition, the band saw blade 1 has a group consisting of saw teeth 4R and 10L each having a tooth tip which substantially describes second imaginary curve L6 running parallel to the first imaginary curve L5.

That is, when the tooth tips of the saw teeth 2S, 6L and 8R are connected by a smooth curve, the first imaginary curve L5 running parallel to the waves 5a of the back surface 5 can be obtained at the position opposite to the waves 5a of the back surface 5. When the tooth tips of the saw teeth 4R and 10L are connected by a smooth curve, the second imaginary curve L6 running parallel to the first imaginary curve L5 can be obtained.

Since the first imaginary curve L5 is formed at an outer position and the second imaginary curve L6 is formed more inwards, the group of the plural saw teeth 2S, 6L and 8R each having the tooth tip which describes the first imaginary curve L5 is a group of high saw teeth. The group of the plural saw teeth 4R and 10L each having the tooth tip which describes the second imaginary curve L6 is a group of low saw teeth.

Although imaginary curves L5 and L6 are employed, three imaginary curves are employed if saw teeth each having an intermediate height (not shown) are provided. That is, when a plurality of groups respectively having different heights are formed, the number of the imaginary curves corresponds to the number of groups respectively having individual heights.

In the band saw blade 1, the saw tooth 2S is a straight tooth having no set width. The saw teeth 4R and 8R are right-hand set teeth, while the saw teeth 6L and 10L are left-hand set teeth. As can be understood from FIGS. 6A and 6B, the right and left set width A2 of the right and left set teeth 4R and 10L each having the tooth tip which describes the second imaginary curve L6 is made to be lager than the right and left set width A1 of the right and left set teeth 8R and 6L each having the tooth tip which describes the first imaginary curve L5.

That is, the group of the plurality saw teeth having different heights is structured such that the set width A2 of the group of low saw teeth is made to be larger than the set width A1 of the group of the high saw teeth. That is, the tooth group having the tooth tip which more describes the second imaginary curve L6 near the back surface 5 is given a larger set width.

Specifically, it is preferable that the amplitude of the waves 5a and 5b or the plural imaginary curves L5 and L6 be 0.1 mm to 3.0 mm and the distance between the first imaginary curve L5 and the second imaginary curve L6 be 0.05 mm or longer. Although no regular relationship is provided among the imaginary curves L5 and L6 and the plurality of the tooth groups shown in FIGS. 6A and 6B, a regular relationship may be provided such that, for example, the straight teeth 2S substantially describes the tip end of the imaginary curve L5. Although the right and left set teeth are made to be the set teeth 4R, 6L, 8R and 10L, dovetail teeth may be employed in place of the right and left set teeth.

When a workpiece having a large diameter is cut by the band saw blade 1 having the above-mentioned structure, the wavy back surface 5 in the shape formed by overlapping the plurality of the waves 5a and 5b, which are periodically or irregularly changed, is rocked along the backup guide of the band saw blade 1. Therefore, the cut length can be shortened even if a workpiece having a large diameter is cut. Since the structure is formed such that the set width A2 is made to be more larger for the group of the teeth 4R and 10L each having the tooth tip which substantially describes the second imaginary curve L6 near the back surface 5, swarf can be fined.

That is, even a workpiece having a large-diameter, which cannot be cut easily, can be cut with a short cut length as if a workpiece having a small diameter is cut. Since the swarf can be fined, the resistance during cutting can be weakened and noise generated due to resonance of the band saw blade 1 can be eliminated more effectively. Moreover, unintentional bending in cutting can be prevented.

Referring to FIGS. 7A and 7B, a fourth embodiment of the present invention will now be described. A band saw blade 1 has a multiplicity of saw teeth formed opposite to a back surface 5 of a body 3 of the band saw blade 1. Specifically, the band saw blade 1 has a wavy back surface 5 having a shape formed by overlapping a plurality of waves 5a and 5b which are changed periodically or irregularly. The waves 5a are small waves, while the waves 5b are large waves, the waves 5a being formed along undulation of the waves 5b. Moreover, the band saw blade 1 has a group consisting of a plurality of saw teeth 2S, 6L and 8R each having a tooth tip which substantially describes first imaginary curve L1 running parallel to the waves 5b. In addition, the band saw blade 1 has a group consisting of saw teeth 4R and 10L each having a tooth tip which substantially describes second imaginary curve L2 running parallel to the first imaginary curve L1.

That is, when the tooth tips of the saw teeth 2S, 6L and 8R are connected by a smooth curve, the first imaginary curve L1 running parallel to the waves 5b of the back surface 5 can be obtained at the position opposite to the waves 5b of the back surface 5. When the tooth tips of the saw teeth 4R and 10L are connected by a smooth curve, the second imaginary curve L2 running parallel to the first imaginary curve L1 can be obtained.

Since the first imaginary curve L1 is formed at an outer position and the second imaginary curve L2 is formed more inwards adjacent to the back surface 5, the group of the plural saw teeth 2S, 6L and 8R each having the tooth tip which describes the first imaginary curve L1 is a group of high saw teeth. The group of the plural saw teeth 4R and 10L each having the tooth tip which describes the second imaginary curve L2 is a group of low saw teeth.

Although imaginary curves L1 and L2 are employed, three imaginary curves are employed if saw teeth each having an intermediate height (not shown) are provided. That is, when a plurality of groups respectively having different heights are formed, the number of the imaginary curves corresponds to the number of groups respectively having individual heights.

In the band saw blade 1, the saw tooth 2S is a straight tooth having no set width. The saw teeth 4R and 8R are right-hand set teeth, while the saw teeth 6L and 10L are left-hand set teeth. As can be understood from FIGS. 7A and 7B, the right and left set width A2 of the right and left set teeth 4R and 10L each having the tooth tip which describes the second imaginary curve L2 is made to be lager than the right and left set width A1 of the right and left set teeth 8R and 6L each having the tooth tip which describes the first imaginary curve L1.

That is, the group of the plurality saw teeth having different heights is structured such that the set width A2 of the group of low saw teeth is made to be larger than the set width A1 of the group of the high saw teeth. That is, the tooth group having the tooth tip which more describes the second imaginary curve L2 near the back surface 5 is given a larger set width.

Specifically, it is preferable that the amplitude of the waves 5b and 5b of the back surface 5 or the plural imaginary curves L1 and L2 be 0.1 mm to 3.0 mm and the distance between the first imaginary curve L1 and the second imaginary curve L2 be 0.05 mm or longer. Although no regular relationship is provided among the imaginary curves L1 and L2 and the plurality of the tooth groups shown in FIGS. 7A and 7B, a regular relationship may be provided such that, for example, the straight teeth 2S substantially describes the tip end of the imaginary curve. Although the right and left set teeth are made to be the set teeth 4R, 6L, 8R and 10L, dovetail teeth may be employed in place of the right and left set teeth.

When a workpiece having a large diameter is cut by the band saw blade 1 having the above-mentioned structure, the wavy back surface 5 having the shape formed by overlapping the plurality of the waves 5a and 5b, which are periodically or irregularly changed, is rocked along the backup guide of the band saw blade 1. Therefore, the cut length can be shortened even if a workpiece having a large diameter is cut. Since the structure is formed such that the set width A2 is made to be more larger for the group of the teeth 4R and 10L each having the tooth tip which substantially describes the second imaginary curve L2 near the back surface 5, swarf can be fined.

That is, even a workpiece having a large-diameter, which cannot be cut easily, can be cut with a short cut length as if a workpiece having a small diameter is cut. Since the swarf can be fined, the resistance during cutting can be weakened and noise generated due to resonance of the band saw blade 1 can be eliminated more effectively. Moreover, unintentional bending in cutting can be prevented.

Referring to FIGS. 8A and 8B, a fifth embodiment of the present invention will now be described. A band saw blade 1 has a multiplicity of saw teeth formed opposite to a back surface 5 of a body 3 of the band saw blade 1. Specifically, the band saw blade 1 has a wavy back surface 5 having a shape formed by overlapping a plurality of waves 5a and 5b which are changed periodically or irregularly. The waves 5a are small waves, while the waves 5b are large waves, the waves 5a being formed along undulation of the waves 5b.

Moreover, the band saw blade 1 has a group consisting of a plurality of saw teeth 2S, 6L and 8R each having a tooth tip which substantially describes first imaginary straight line L3 running parallel to the back surface 5 at a position opposite to the back surface 5. In addition, the band saw blade 1 has a group consisting of saw teeth 4R and 10L each having a tooth tip which substantially describes second imaginary straight line L4 running parallel to the first imaginary straight line L3. That is, when the tooth tips of the saw teeth 2S, 6L and 8R are connected by a smooth straight line, the first imaginary straight line L3 can be obtained. When the tooth tips of the saw teeth 4R and 10L are connected by a smooth straight line, the second imaginary straight line L4 running parallel to the first imaginary straight line L3 can be obtained.

Since the first imaginary straight line L3 is formed at an outer position and the second imaginary straight line L4 is formed more inwards, the group of the plural saw teeth 2S, 6L and 8R each having the tooth tip which describes the first imaginary straight line L3 is a group of high saw teeth. The group of the plural saw teeth 4R and 10L each having the tooth tip which describes the second imaginary straight line L4 is a group of low saw teeth. Although imaginary straight lines L1 and L2 are employed, three imaginary straight lines are employed if saw teeth each having an intermediate height (not shown) are provided. That is, when a plurality of groups respectively having different heights are formed, the number of the imaginary straight lines corresponds to the number of groups respectively having individual heights.

In the band saw blade 1, the saw tooth 2S is a straight tooth having no set width. The saw teeth 4R and 8R are right-hand set teeth, while the saw teeth 6L and 10L are left-hand set teeth. As can be understood from FIGS. 8A and 8B, the right and left set width A2 of the right and left set teeth 4R and 10L each having the tooth tip which describes the second imaginary straight line L4 is made to be lager than the right and left set width A1 of the right and left set teeth 8R and 6L each having the tooth tip which describes the first imaginary straight line L3.

That is, the group of the plurality saw teeth having different heights is structured such that the set width A2 of the group of low saw teeth is made to be larger than the set width A1 of the group of the high saw teeth. That is, the tooth group having the tooth tip which more describes the second imaginary straight line L4 near the back surface 5 is given a larger set width. Specifically, it is preferable that the amplitude of the waves 5a and 5b of the back surface 5 be 0.1 mm to 3.0 m and the distance between the first imaginary straight line L3 and the second imaginary straight line L4 be 0.05 mm or longer.

Although the right and left set teeth are made to be the set teeth 4R, 6L, 8R and 10L, dovetail teeth may be employed in place of the right and left set teeth.

When a workpiece having a large diameter is cut by the band saw blade 1 having the above-mentioned structure, the wavy back surface 5 having the shape formed by overlapping the plurality of the waves 5a and 5b, which are periodically or irregularly changed, is rocked along the backup guide of the band saw blade 1. Therefore, the cut length can be shortened even if a workpiece having a large diameter is cut. Since the structure is formed such that the set width A2 is made to be more larger for the group of the teeth 4R and 10L each having the tooth tip which substantially describes the second imaginary straight line L4 near the back surface 5, swarf can be fined.

That is, even a workpiece having a large-diameter, which cannot be cut easily, can be cut with a short cut length as if a workpiece having a small diameter is cut. Since the swarf can be fined, the resistance during cutting can be weakened and noise generated due to resonance of the band saw blade 1 can be eliminated more effectively. Moreover, unintentional bending in cutting can be prevented.

The present invention is not limited to the above-mentioned embodiments. An arbitrary change may be permitted to embody the present invention. That is, for example, the phase of the wavy shape of the back surface 5 and that of the wavy shape in the saw teeth portion may arbitrarily be shifted. The period and/or amplitude and the like of the two wavy portions may be different from each other.

That is, as shown in FIGS. 9A and 9B, the band saw blade 1 may have a structure such that a plurality of tooth groups 2S, 4R, 6L, 8R and 10L each having the tooth tip which substantially describes the plural imaginary curves L1 and L2, which are provided in parallel to one another without correlation or synchronism with the back surface 5, are formed opposite to the wavy back surface 5 which is periodically or irregularly changed.

The structure of the band saw blade 1 shown in FIGS. 9A and 9B has the same structure as the above-mentioned band saw blade except that the structure shown in FIGS. 9A and 9B is formed such that the wavy back surface 5 and the plural imaginary curves L1 and L2 have no correlation or synchronism. Therefore, detailed description is omitted. Also the foregoing structure attains an effect similar to that obtainable from the above-mentioned band saw blade.

FIGS. 10A and 10B show a modification of the band saw blade 1 shown in FIGS. 5A and 5B and has a structure such that the back surface 5 of the band saw blade 1 is formed such that trapezoid projections and pits are repeated. Moreover, the vertical relationship of the right and left set teeth 4R, 6L, 8R and 10L shown in FIGS. 5A and 5B is inverted. The residual structure is the same as that of the above-mentioned band saw blade.

That is, FIGS. 10A and 10B show an example in which the wavy shape of the back surface 5 of the band saw blade 1 may be varied. As can be understood from the foregoing description, the back surface 5 is required to be in the form such that the concave and convex are alternately repeated. For example, a structure may be employed in which crescent-shaped concave or convex is provided at arbitrary intervals in the straight-line portion. In this case, an effect similar to that obtainable from the above-mentioned structure can be obtained.

FIGS. 11A and 11B show anther modification of the band saw blade 1 shown in FIGS. 5A and 5B. The structure shown in FIGS. 11A and 11B is formed such that right and left high set teeth 6R and 2L are formed in front of and in the rear of the straight high tooth 4S. The heights of the other right and left set teeth 12R and 8L is reduced. Moreover, a low straight tooth 10S is formed by the set teeth 8L and 12R.

That is, the structure shown in FIGS. 11A and 11B is formed such that right and left set teeth 2L, 6R, 8L and 12R having the same height are disposed in front and in the rear of the high straight tooth 4S and low straight tooth 10S. Moreover, the right and left set width of the right and left set teeth are made to be substantially the same.

The structure shown in FIGS. 11A and 11B is formed such that height tooth groups 2L, 4S and 6R and low tooth groups 8L, 10S and 12R are alternately formed so that concave and convex portions are repeated in the saw tooth portion. The high saw tooth groups 2L, 4S and 6R acts strongly when cutting a workpiece. When a workpiece which cannot easily be cut is cut such that a portion lower than the processed hard layer is cut. Thus, the cutting characteristic can be improved.

Since the saw tooth portion is in the form in which concave and convex portions are repeated and the back side has the wavy shape, an effect of cutting a portion below the processed hard layer and an effect of shortening the cut length can be obtained. Even if the workpiece has a large diameter, it can be cut similarly to a workpiece having a small diameter. Therefore, also the band saw blade according to this modification attains a similar effect.

As a matter of course, the saw tooth portion may be formed into an arbitrary wavy shape. In this case, the foregoing effect can, of course, be obtained, and another effect of oscillation-cutting can be obtained.

FIGS. 12A and 12B show a band saw blade having a structure such that high straight teeth 2S and low dovetail set teeth 4B are alternately formed. Moreover, both of the back surface 5 of the band saw blade 1 and the tooth portion are formed into the wavy shape which is formed along the imaginary curves L1 and L2. Also the foregoing structure attains substantially similar effect obtainable from the above-mentioned band saw blade.

Since the foregoing structure is formed such that the dovetail set teeth are employed, ghost pattern on the cut surface can significantly be prevented. Thus, an effect can be obtained in that a cut surface having an excellent shape is obtained.

FIGS. 13A and 13B show a structure of a band saw blade having a shape formed such that only the straight tooth 2S is formed into a high tooth, the right and left set teeth 4R and 6L are formed into low teeth, and the back surface 5 of the band saw blade 1 and the tooth portion are formed into wavy shapes. Also the foregoing structure attains an effect similar to that obtainable from the above-mentioned band saw blade.

As can be understood from the foregoing description, the band saw blade according to the present invention attains similar effect if it has the wavy back surface 5 and the saw teeth have different heights. Specifically, the wavy back surface may be a wavy back surface which is periodically or irregularly changed, or a wave back surface formed by overlapping a plurality of waves which are periodically or irregularly changed. As an alternative to this, the back surface may be a back surface having a shape in which concave and convex portions are alternately repeated. Another structure may be employed which is formed by combining the above-mentioned structures. Specifically, the shape in which the heights of the saw teeth are different from each other may be a shape having a plurality of tooth groups having the tooth tips which substantially describe the plurality of imaginary curves or the plurality of imaginary straight lines running parallel to the back surface. Another structure may be employed which has a plurality of tooth groups having the tooth tips which substantially describe a plurality of imaginary curves having no correlation or synchronism with the back surface and formed opposite to the back surface. The saw teeth may be combination of straight teeth, set teeth, dovetail set teeth or the like. Moreover, arbitrary modification and combination are permitted.

It is apparent that various embodiments may be configured without departing from the spirit and scope of the present invention. Therefore, the present invention is not limited to the specific embodiments disclosed except those limited by the appended claims.

What is claimed is:

1. A band saw blade (1), comprising:
   a wavy back surface (5) forming a wave which oscillates periodically;
   a first left set tooth (6L) having a tooth tip which substantially describes a first imaginary curve (L1) running parallel to the back surface (5);
   a fist right set tooth (8R) having a tooth tip which substantially describes the first imaginary curve (L1);
   a second left set tooth (10L) having a tooth tip which substantially describes a second imaginary curve (L2) running parallel to the back surface (5);
   a second right set tooth (4R) having a tooth tip which substantially describes the second imaginary curve (L2); and
   a straight tooth (2S) having a tooth tip which substantially describes the first imaginary curve (L1),
   wherein the first imaginary curve (L1) is located farther from the back surface (5) than the second imaginary curve (L2);
   wherein the second left set tooth (10L) and the second right set tooth (4R) constitute the largest set width (A2) among the first left set tooth (6L) and the first right set tooth (8R) which constitute a first set width (A1), the second left set tooth (10L) and the second right set tooth (4R) which constitute a second set width (A2), and the straight tooth (2S);
   wherein the second left set tooth (10L), the straight tooth (2S) and the second right set tooth (4R) are arranged in a manner such that the straight tooth (2S) is located between the second left set tooth (10L) and the second right set tooth (4R);
   wherein the band saw blade is formed with a sequence of the first right set tooth (8R), the first left set tooth (6L), the second right set tooth (4R), the straight tooth (2S) and the second left set tooth (10L) which are connected in this order;
   wherein each amplitude of the first imaginary curve (L1) and the second imaginary curve (L2) is in a range of 0.1 mm to 3.0 mm; and wherein the distance between the first imaginary curve (L1) and the second imaginary curve (L2) is 0.5 mm or longer; and wherein the wavy back surface (5) includes small waves (5a) juxtaposed on large waves in such a manner that the wavy back surface (5) is formed with the small waves (5a) along the undulation of the large waves of the wavy back surface (5) wherein the small waves (5a) have smaller waves than the large waves of the wavy back surface (5).

* * * * *